United States Patent
Inuiya (12)
(10) Patent No.: US 6,597,468 B1
(45) Date of Patent: *Jul. 22, 2003

(54) IMAGE PRINT SYSTEM FOR PRINTING A PICTURE FROM AN ADDITIONAL INFORMATION AFFIXED IMAGE FILE

(75) Inventor: Masafumi Inuiya, Asaka (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,947

(22) Filed: Apr. 1, 1998

(30) Foreign Application Priority Data

Apr. 1, 1997 (JP) .............................. 9-098392
Apr. 2, 1997 (JP) .............................. 9-083792

(51) Int. Cl.$^7$ .............................. G06F 15/00; H04N 5/76
(52) U.S. Cl. .................................... 358/1.15; 348/231.3
(58) Field of Search .............................. 358/527, 530, 358/540, 450, 448, 487, 1.1, 1.2, 1.4, 1.9, 1.18; 382/284, 294; 355/27, 38; 396/321; 348/64, 73; H04N 1/40

(56) References Cited

U.S. PATENT DOCUMENTS

| | | | | |
|---|---|---|---|---|
| 4,862,200 A | * | 8/1989 | Hicks | 354/75 |
| 5,142,310 A | * | 8/1992 | Taniguchi et al. | 354/106 |
| 5,604,579 A | * | 2/1997 | Kushida | 355/400 |
| 5,606,365 A | * | 2/1997 | Maurinus et al. | 348/222 |
| 5,608,542 A | * | 3/1997 | Krahe et al. | 358/450 |
| 5,633,733 A | * | 5/1997 | Miyazawa | 358/527 |
| 5,666,159 A | * | 9/1997 | Parulski et al. | 348/211 |
| 5,799,219 A | * | 8/1998 | Moghadam et al. | 358/527 |
| 5,809,520 A | * | 9/1998 | Edwards et al. | 711/115 |
| 5,822,660 A | * | 10/1998 | Wen | 358/450 |
| 5,838,457 A | * | 11/1998 | Umemoto | 358/527 |
| 5,852,502 A | * | 12/1998 | Beckett | 358/512 |
| 5,852,503 A | * | 12/1998 | Kawaoka | 358/527 |
| 5,864,651 A | * | 1/1999 | Lavie et al. | 395/114 |
| 5,883,698 A | * | 3/1999 | Kimura | 358/527 |
| 5,929,906 A | * | 7/1999 | Arai et al. | 348/223 |
| 5,966,553 A | * | 10/1999 | Nishitani et al. | 396/303 |
| 5,978,016 A | * | 11/1999 | Lourette et al. | 348/64 |
| 6,097,431 A | * | 8/2000 | Anderson et al. | 348/233 |
| 6,396,472 B1 | * | 5/2002 | Jacklin | 345/104 |

* cited by examiner

Primary Examiner—Madeleine Nguyen
(74) Attorney, Agent, or Firm—Birch, Stewart, Kolasch & Birch, LLP (57) ABSTRACT

An image print system for printing a picture from an image file having additional information, which enables high-quality image printing to be achieved using various types of image data and their additional information. Image data obtained by taking subjects are sent, together with their additional information, to an image reproduction system in a photographic laboratory. The image reproduction system carries out processing of the image data in accordance with the additional information, and produces its resultant images in the form of image prints. The additional information includes post-processing information for temporally or spatially correlating a series of images to combine them or to select some of them.

29 Claims, 9 Drawing Sheets

| TYPES OF INFORMATION | ITEMS |
|---|---|
| INFORMATION EFFECTIVE IN IMPROVING PICTURE QUALITY (50) | 1) PHOTOGRAPHING METHODS AND PARAMETERS<br>• SIGNAL-IMAGE SENSOR ARRAY OR TRIPLE-IMAGE SENSOR ARRAY<br>• CHARACTERISTICS OF COLOR FILTERS (PRIMARY COLORS OR COMPLEMENTARY COLORS)<br>• FILTER ARRANGEMENT (BAYER, G-STRIPE RB-CHECK, ETC.)<br>2) SIGNAL PROCESSING METHOD<br>• RGB PROCESSING OR YC PROCESSING<br>• COMPRESSION SCHEME (JPEG, DPCM, NON-COMPRESSED, ETC.)<br>• TONAL TRANSFER CHARACTERISTICS (GAMMA, Knee CHARACTERISTICS) |
| INFORMATION EFFECTIVE IN CORRECTING PICTURE QUALITY (52) | • SHADING VALUE (INCLUDING LENS AND CCD)<br>• CORRECTING VALUE OF PHOTO-CELL DEFECTS OF CCD |
| INFORMATION FOR IMPROVING PICTURE QUALITY IN POST-PROCESSING (54) | • WIDE DYNAMIC RANGE PROCESSING (LOW SENSITIVITY; HIGH SENSITIVITY; WITH USING TWO PIECES OF IMAGE FILES, CARRYING OUT WIDE DYNAMIC RANGE IMAGE COMPOSITION OR MASKED PRINTING)<br>• FILING CCD OUTPUT AS IT IS, AND PROCESSING SIGNALS AT THE PRINTER SIDE<br>• TAKING MULTIPLE IMAGES WITH ALTERING EXPOSURE, AND SELECTING APPROPRIATELY EXPOSED IMAGES AT THE PRINTER SIDE |
| INFORMATION EFFECTIVE IN PRINTER SETUP (56) | 1) SET VALUES IN A CAMERA DURING PHOTOGRAPHING<br>• LV VALUE, EV VALUE (OR SHATTER SPEED, F VALUE OF LENS, CCD SENSITIVITY)<br>• AF VALUE (RANGE TO A MAIN SUBJECT)<br>• COLOR TEMPERATURE (OR AWB ON/OFF)<br>• STROBING OR NOT (STROBOSCOPIC COLOR TEMPERATURE)<br>• STROBE GUIDE NUMBER<br>• POSITION OF A MAIN SUBJECT (IN THE CASE OF A GAZE SENSING AUTOMATIC FOCUSING CAMERA)<br>• DATE AND TIME OF PHOTOGRAPHING |

| Fig. 4 |
|---|
| Fig. 4A |
| Fig. 4B |

| TYPES OF INFORMATION | ITEMS |
|---|---|
| INFORMATION EFFECTIVE IN IMPROVING PICTURE QUALITY | 1) PHOTOGRAPHING METHODS AND PARAMETERS<br>• SIGNAL-IMAGE SENSOR ARRAY OR TRIPLE-IMAGE SENSOR ARRAY<br>• CHARACTERISTICS OF COLOR FILTERS (PRIMARY COLORS OR COMPLEMENTARY COLORS)<br>• FILTER ARRANGEMENT (BAYER, G-STRIPE RB-CHECK, ETC.)<br>2) SIGNAL PROCESSING METHOD<br>• RGB PROCESSING OR YC PROCESSING<br>• COMPRESSION SCHEME (JPEG, DPCM, NON-COMPRESSED, ETC.)<br>• TONAL TRANSFER CHARACTERISTICS (GAMMA, Knee CHARACTERISTICS) |
| INFORMATION EFFECTIVE IN CORRECTING PICTURE QUALITY | • SHADING VALUE (INCLUDING LENS AND CCD)<br>• CORRECTING VALUE OF PHOTO-CELL DEFECTS OF CCD |

Fig. 4B

| | |
|---|---|
| INFORMATION FOR IMPROVING PICTURE QUALITY IN POST-PROCESSING | • WIDE DYNAMIC RANGE PROCESSING (LOW SENSITIVITY; HIGH SENSITIVITY; WITH USING TWO PIECES OF IMAGE FILES, CARRYING OUT WIDE DYNAMIC RANGE IMAGE COMPOSITION OR MASKED PRINTING)<br>• FILING CCD OUTPUT AS IT IS, AND PROCESSING SIGNALS AT THE PRINTER SIDE<br>• TAKING MULTIPLE IMAGES WITH ALTERING EXPOSURE, AND SELECTING APPROPRIATELY EXPOSED IMAGES AT THE PRINTER SIDE |
| INFORMATION EFFECTIVE IN PRINTER SETUP | 1)<br>• SET VALUES IN A CAMERA DURING PHOTOGRAPHING<br>• LV VALUE, EV VALUE (OR SHUTTER SPEED, F VALUE OF LENS, CCD SENSITIVITY)<br>• AF VALUE (RANGE TO A MAIN SUBJECT)<br>• COLOR TEMPERATURE (OR AWB ON/OFF)<br>• STROBING OR NOT (STROBOSCOPIC COLOR TEMPERATURE)<br>• STROBE GUIDE NUMBER<br>• POSITION OF A MAIN SUBJECT (IN THE CASE OF A GAZE SENSING AUTOMATIC FOCUSING CAMERA)<br>• DATE AND TIME OF PHOTOGRAPHING |

IMAGE PRINT SYSTEM FOR PRINTING A PICTURE FROM AN ADDITIONAL INFORMATION AFFIXED IMAGE FILE

BACKGROUND OF THE INVENTION

1. Field of the Invention

The present invention relates to an image print system for printing still pictures from an image file having additional information, which file contains image data representing the still images and additional information representing characteristics of the image data.

2. Description of the Background Art

An electronic digital still camera (DS camera), for example, records on a recording medium like an IC (integrated circuit) memory card not only images in the form of digital data, but also additional information representing characteristics of photographed images such as exposure, color filter information about the image pickup device. For example, Japanese patent laid-open publication No. 75922/1993 assigned to the same assignee as that of the present application discloses a photosensitive film with an additional information recording area, which has magnetic strips formed on a silver-halide photo-sensitive film for recording the additional information as in an advanced photograph system (APS). Besides, an enhanced APS is proposed which comprises a film cartridge including an IC memory in which the additional information is to be recorded.

In addition, a system is also proposed which implements various image operations like image composition using such additional information recorded on the image file. For example, Japanese patent application No. 35781/1996 filed in the name of the same assignee as that of the present application discloses an image composite apparatus for combining desired images into a template image using the additional information. Since the DS (digital still) camera stores the image in the digital form, the user can achieve the image operation or processing by himself or herself with the DS camera itself or a personal computer. To obtain higher resolution, beautiful finish color pictures such as those printed on postal cards, it is preferable to request to a specialist like a photo laboratory. For example, Japanese patent application No. 35780/1996 filed in the name of the same assignee as that of the present application discloses an image filing system which converts, in a laboratory of specialists, images into digital image data, and stores them on an image data recording medium like an magneto-optical disk.

In the state of the art, solid-state image pickup devices like a CCD (charge-coupled device) employed in the DS cameras, for example, have a rather narrow dynamic range. The DS cameras employing a memory card as a recording medium of the image data, however, have an advantage of being able to rewrite image data on the memory card many times. Besides, diversification of the image recording system and recording media makes it possible to use various types of recording media from silver-halide photosensitive film to magnetic recording media and optical recording media. In addition, the environment for processing the image data and additional information is also growing diversified such that users can process the image data or add the additional information using personal computers.

SUMMARY OF THE INVENTION

In view of the state of the art described above, an object of the present invention is to provide an image print system capable of achieving high quality image printing from an image file having additional information with various types of image data and their additional information utilized.

According to an aspect of the present invention, there is provided an image print system for printing a picture from an image file having additional information, wherein the image print system receives image data obtained by taking a subject, and additional information associated with the image data; carries out processing of the image data in accordance with the additional information; and produces in the form of a visible image an image represented by the image data which have undergone the processing.

According to another aspect of the present invention, there is provided an image print system for printing a picture from an image file having additional information, comprising: an input device for receiving image data obtained by taking a subject, and additional information associated with the image data; an image processor connected to the input device for carrying out processing of the image data in accordance with the additional information; and an output device for producing in the form of a visible image an image represented by the image data which have undergone the processing.

Here, the additional information may include correlation information for temporally or spatially correlating image data of a plurality of images, and the image processor may carry out at least one of selecting and combining of image data of the plurality of images designated by the correlation information.

According to a further aspect of the present invention, there is provided a method of printing a picture from an image file having additional information, comprising the steps of: capturing an image of a subject to generate image data representing the image of the subject; generating additional information associated with the image data; transferring the image data together with the additional information to an image reproduction system; processing by the image reproduction system the image data in accordance with the additional information transferred; and producing in the form of a visible image an image represented by the image data which have been processed by the image reproduction system.

BRIEF DESCRIPTION OF THE DRAWINGS

The objects and features of the present invention will become more apparent from consideration of the following detailed description taken in conjunction with the accompanying drawings in which:

FIG. 4 shows how FIGS. 4A and 4B are combined;

DESCRIPTION OF THE PREFERRED EMBODIMENTS

Figure 1:
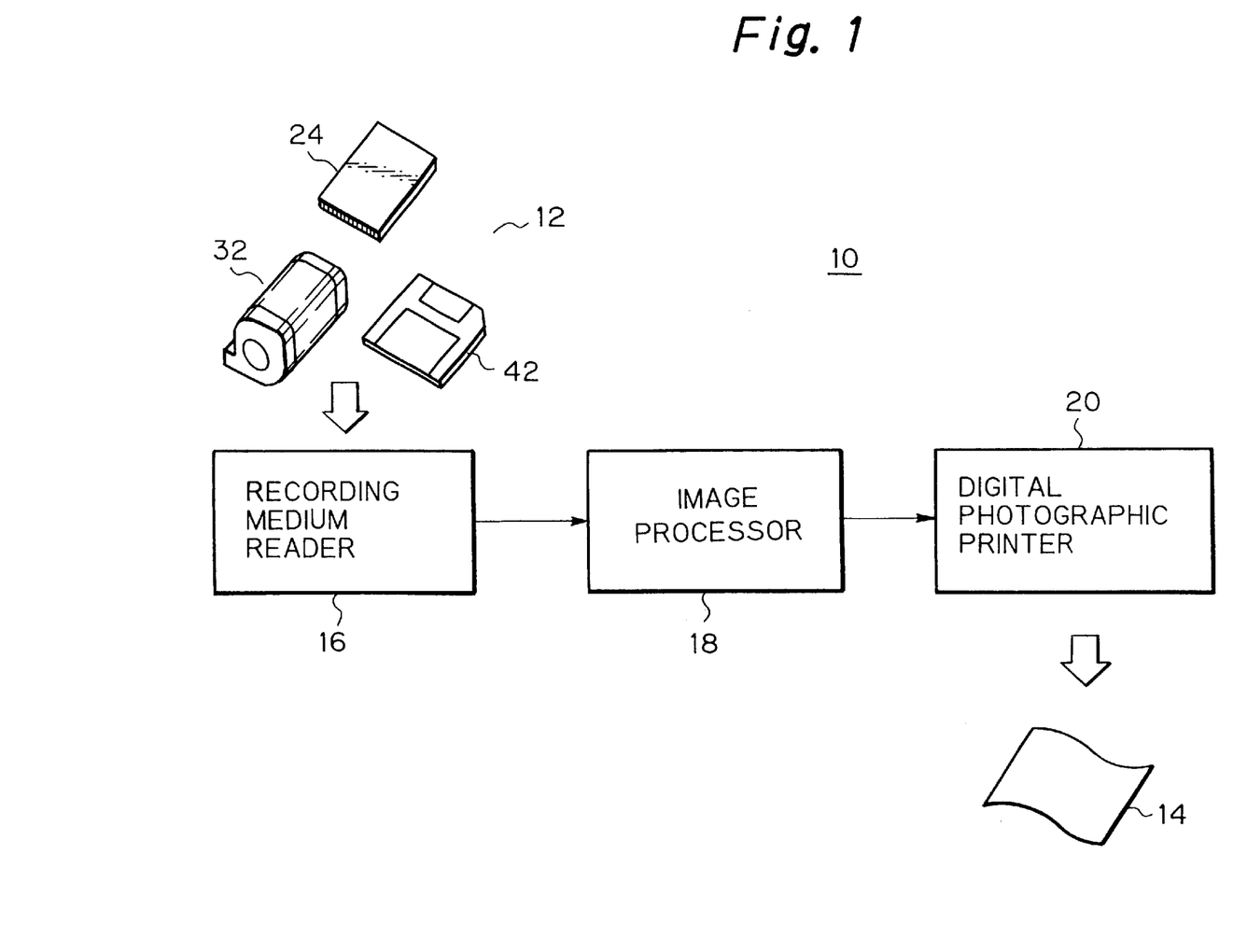
FIG. 1 is a functional block diagram schematically showing an embodiment of an image reproduction system, intended for laboratory use, of an image print system for producing pictures from an image file having additional information in accordance with the present invention.

Referring to FIG. 1, an embodiment of an image reproduction system 10 in accordance with the present invention is intended for the photograph laboratory use of an image print system for printing pictures from an image file having additional information. The system 10 is adapted to read image data and additional information from one of image recording media 12, reproduce an image represented by the image data in accordance with the additional information, and print the reproduced image on recording paper in the form of a photographic print 14. It is preferable that the image reproduction system 10 be installed in a laboratory of commercial specialists. The system 10 in the embodiment comprises a recording medium reader 16 for reading the image data and additional information; an image processor 18 for processing the image data in accordance with the additional information thus read in; and a digital photographic printer 20 that is adapted to reproduce an image represented by the image data processed, and print it in the form of a photographic print 14 as a visible image.

Figure 2:
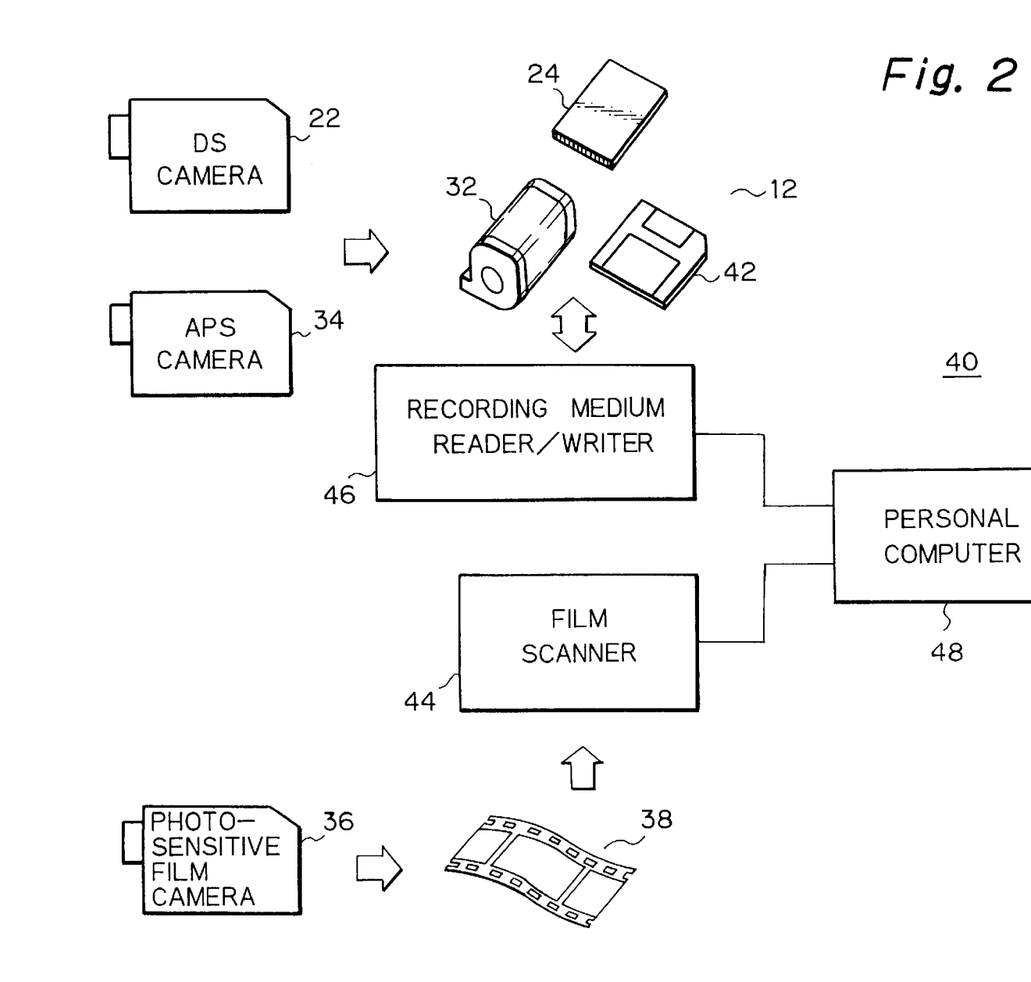
FIG. 2 is a functional block diagram schematically showing an embodiment including a user side personal computer of an image print system in accordance with the present invention.
Figure 3:
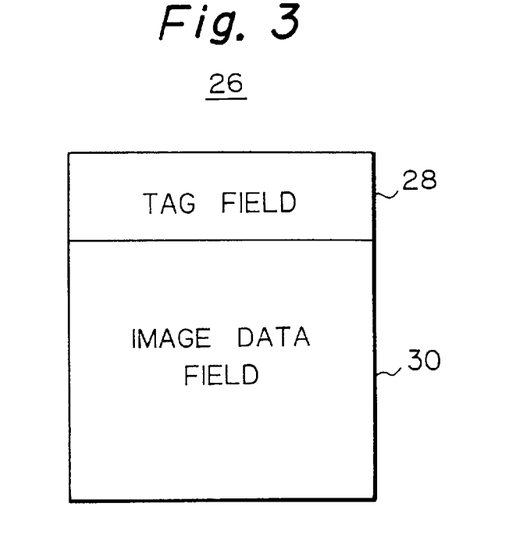
FIG. 3 schematically illustrates a structure of an image file in the embodiment shown in FIG. 1.

Various types of image recording media are applicable as the image recording media 12 of the image reproduction system 10. For example, from a DS camera (electronic digital still camera) 22 in FIG. 2, image recording media are provided in the form of an IC (integrated circuit) memory card 24. The IC memory card 24 has a plurality of memory areas 26, each including a tag area 28 and image data area 30 as shown in FIG. 3. The tag area or field 28 stores the additional information as will be described later, and the image data area or field 30 stores the image data for each picture. The image data can be either compressed or not. In the specification, data or signals are designated with the reference numerals which are directed to fields or connections which contain or convey the data or signals.

Returning now to FIG. 2, the image recording media 12 include an APS film 32 with the additional information, which is applicable to the foregoing APS system. As is well-known, the APS film 32 contains the images shot by an APS camera 34, and the additional information such as exposure data, which is associated with the images and recorded on the magnetic stripes, not shown, formed on the film. The APS film 32 is developed in a laboratory, held in a cartridge 32 and is handed to its user. The APS film 32 is set in the recording medium reader 16 of the image reproduction system 10.

The APS film 32 can be either a film type with the magnetic stripes as described above or an enhanced APS type in which an IC memory area for recording the additional information is provided in the film cartridge. The present specification refers to either of them as an additional information affixed photographic film, or simply as an APS film.

The present image reproduction system 10 can also handle a negative or positive film 38 provided by a conventional silver-halide photosensitive film camera 36. A film 38 produced by the film camera 36 is developed in the laboratory, and handed to a user. Its visible images are read in and converted into digital data through a user's processing system such as a personal computer system 40, and the digital data are recorded with the additional information in a large-capacity recording medium 42 like a magnetic recording medium in the format of an image file 26.

As shown in FIG. 2, the personal computer system 40 generally comprises, a personal computer 48, a film scanner 44 for reading the visible images carried on the film 38; and a recording medium reader/writer 46 for reading the image data and additional information recorded on the image recording media 12 and for writing on them the image data and additional information generated by the personal computer system 40. The film scanner 44 and recording medium reader/writer 46 are controlled by the personal computer 48. The personal computer 48, in response to the operation of the user, stores the digital image data in the IC memory card 24 or large-capacity recording medium 42, forms the additional information, and stores it in the IC memory card 24, large-capacity recording medium 42 or the magnetic recording area, not shown, on the APS film 32.

In the instant embodiment, a camera such as the DS camera 22 or APS camera 34 takes a plurality of images which may correlate in time or space. The image file holds as the additional information 28 the information instructing the way to handle these images. For example, the image data undergo image processing like composition based on the additional information when reproducing or printing a picture from the image file. The term "still image" used in the specification refers to a plurality of images having temporal correlation as well as individual images. The term "image file" refers to not only a file of the digital data, but also files of various forms such as the film 38 including the image data and additional information 28 in the analog form as can be seen from the foregoing description.

Although the input is provided to the image reproduction system 10 through the image recording media 12 in the present embodiment, it can be achieved without using such individual media. For example, the invention can be effectively applied to a system which is adapted to receives the image data and additional information over a telecommunications channel.

Figure 4A:
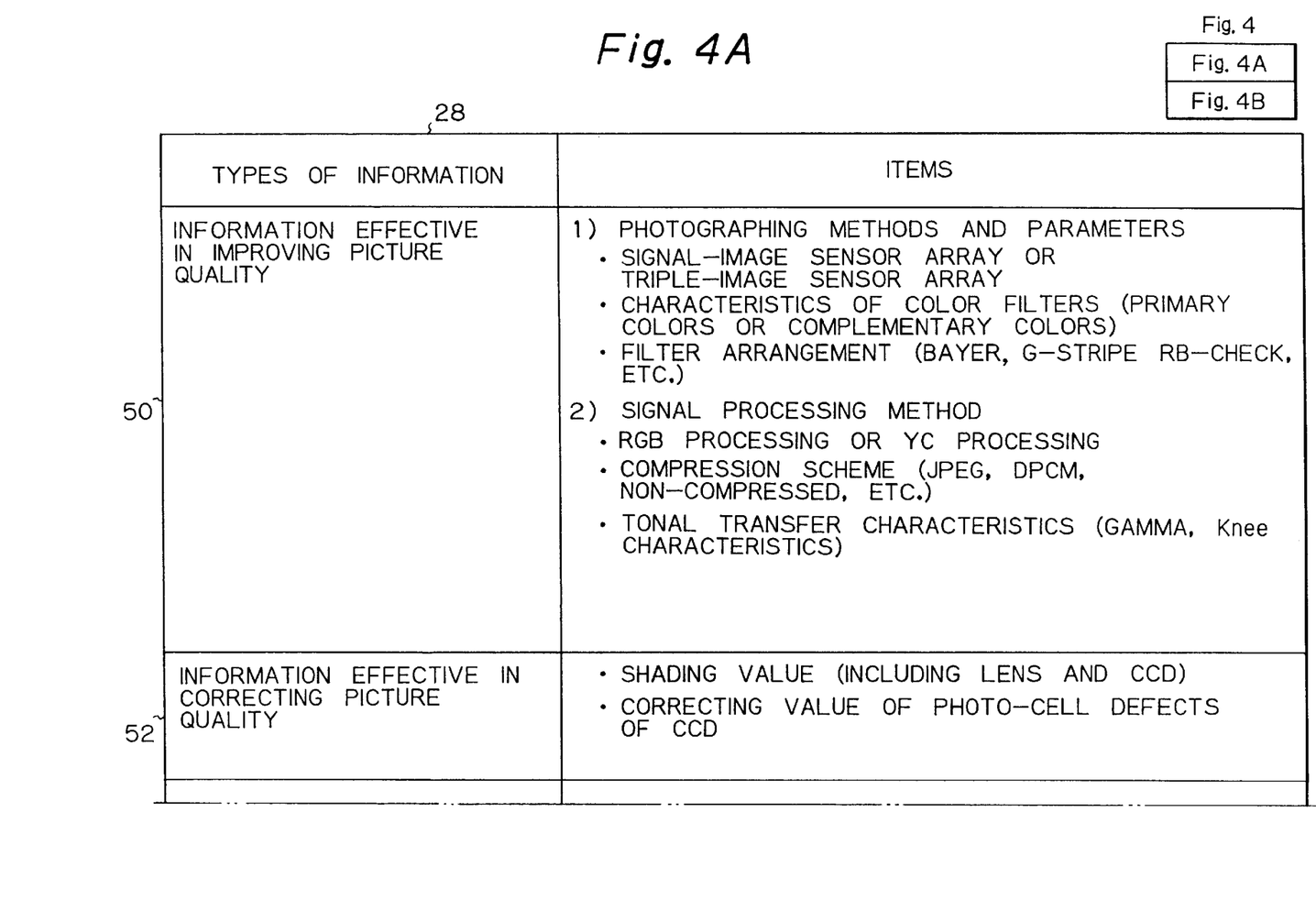
FIGS. 4A and 4B show, when combined as shown in FIG. 4, in the form of a table an example of additional information in the embodiment.
Figure 4B:
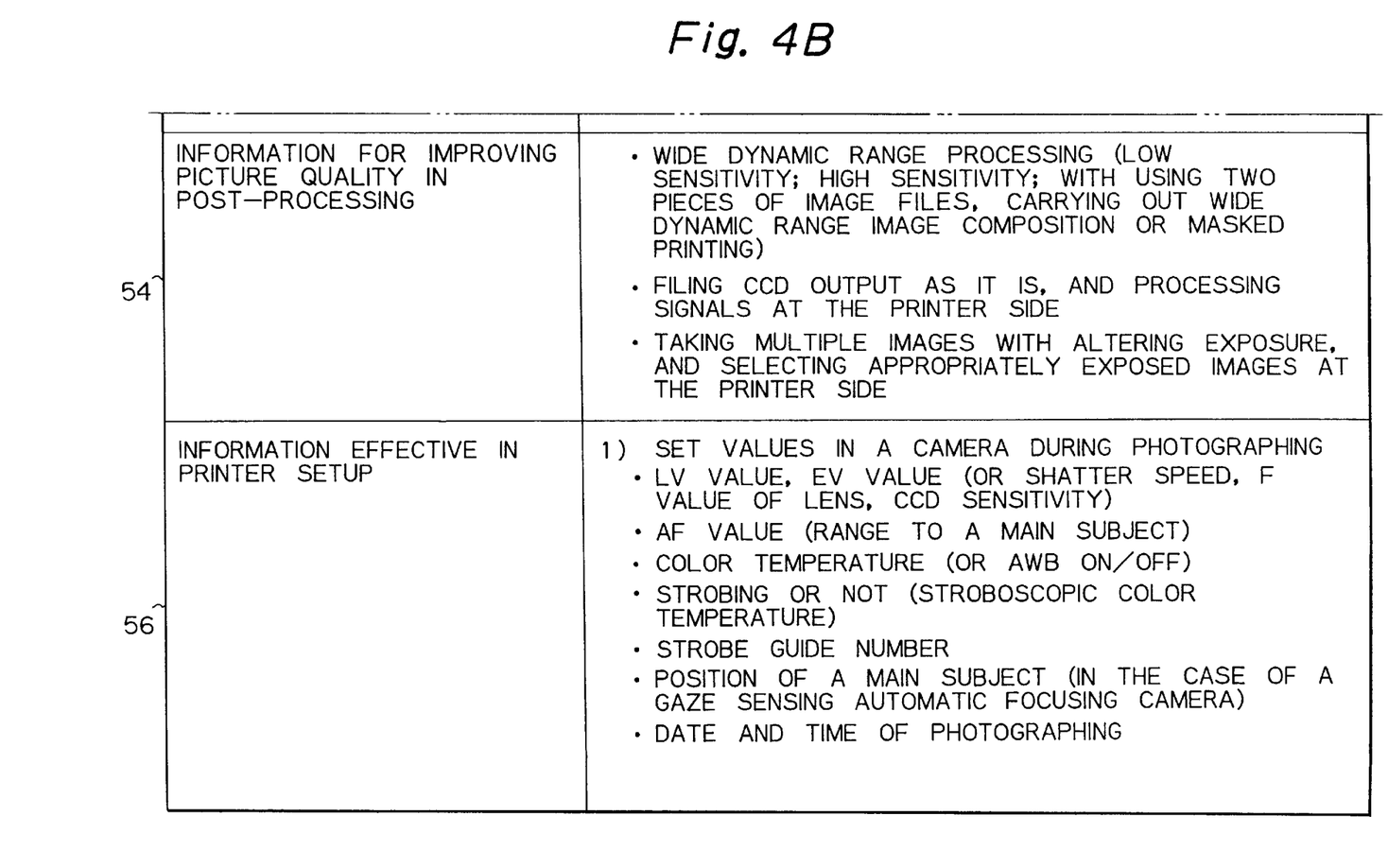

The additional information recorded in the tag area 28 includes the information as shown in FIGS. 4A and 4B, which can be generally referred to as information representing image characteristics. Specifically, the tag area or field 28 includes information 50 effective in improving picture quality, information 52 effective in correcting picture quality, information 54 for improving picture quality in post-processing and information 56 effective in setting up a printer. Among these, the present invention particularly relates to the post-processing, that is, the information 54 for improving picture quality in post-processing in the image reproduction system 10 in the laboratory. The latter information 54 falls roughly into information for performing wide dynamic range (DR) processing; information for the image reproduction system 10 to process the image data as they are output from the image pickup device; and information for the image reproduction system 10 to select a plurality of images taken with altering the exposure condition.

According to the present embodiment, none of users of the cameras, even of the DS camera 22, generally, carry out the image processing. Specifically, although a user can perform the normal signal processing such as gray level correction with the DS camera 22, the image processing associated with the information 54 for improving picture quality in post-processing is usually carried out in the image reproduction system 10 in the laboratory. For this purpose, the present invention utilizes the additional information 28 which can be generated by the DS camera 22 or APS camera 34, or produced or handled by the user with the personal computer system 40. The information is provided for the laboratory along with the image data in the form of the image recording media 12 to be input to the image reproduction system 10.

In the present embodiment, the information for the wide dynamic range processing consists of the additional information which includes information indicating that two pictures are taken by the DS camera 22 for the same scene at different sensitivities, and frame information for identifying the two pictures. The wide dynamic range processing merges low-sensitivity and high-sensitivity images into a single image. Two or more images may be combined into one or more images as well. Such additional information is generated by the DS camera 22, and recorded in the tag area 28 of the IC memory card 24 such that it corresponds to the image. The APS camera 34 also generates the additional information, and records it on the APS film 32. Alternatively, the personal computer 48 can generate the additional information by reading the IC memory card 24 or APS film 32 set on the recording medium reader/writer 46, and by recording the additional data on the IC memory card 24 or APS film 32 in such a manner that it corresponds to the image data. It may also be stored in the large-capacity recording medium 42. In particular, two images taken by the photosensitive film camera 36 are read by the film scanner 44, converted into image data by the personal computer 48, and stored in the large-capacity recording medium 42 along with the additional information which indicates that the two images are taken at different sensitivities, and which includes their image frame information.

Figure 5:
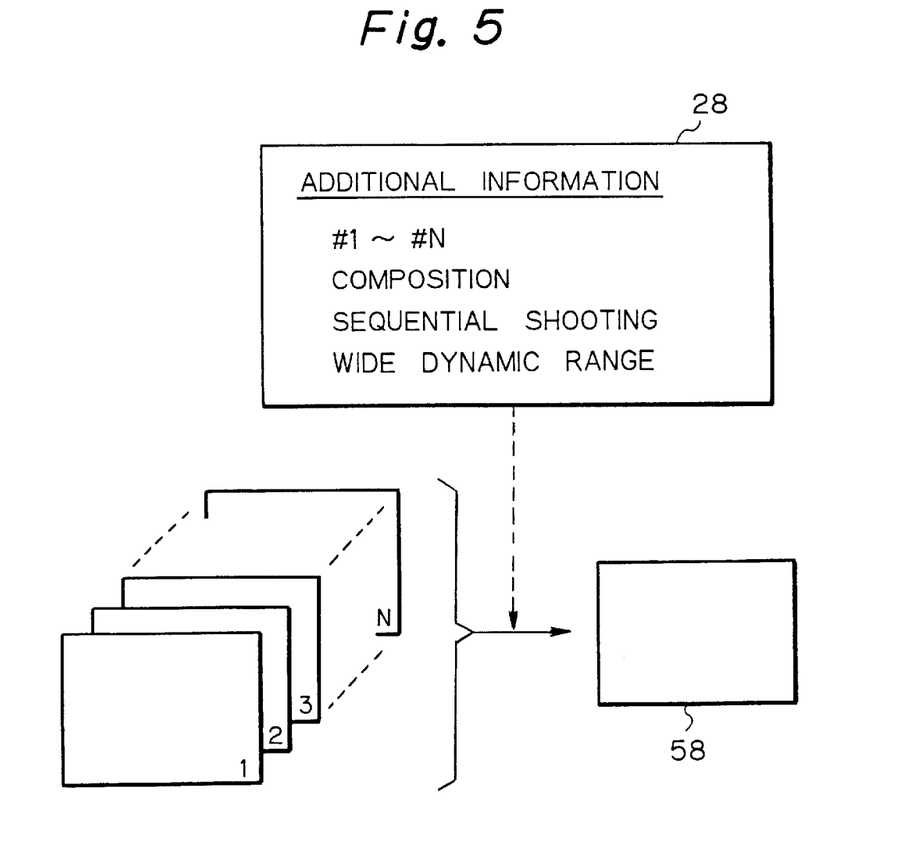
FIG. 5 is useful for understanding composition of multiple images in the embodiment.

The image recording media 12 thus holding the additional information 28 is brought into a laboratory, and is set on the recording medium reader 16 in the image reproduction system 10 so that the image reproduction system 10 reads out the image data from the image data area 30 and the additional information from the tag area 28. The image processor 18 identifies the couple of associated images from the additional information 28, and combines them to a single image. FIG. 5 schematically illustrates the general process for combining N images into a single image 58, where N is a natural number greater than one. The image 58 is printed out in the form of photographic print 14 through the digital photographic printer 20. Here, a laboratory refers to an institute such as a photo-developing-printing shop for commercial specialists of photographic or image processing.

Figure 6:
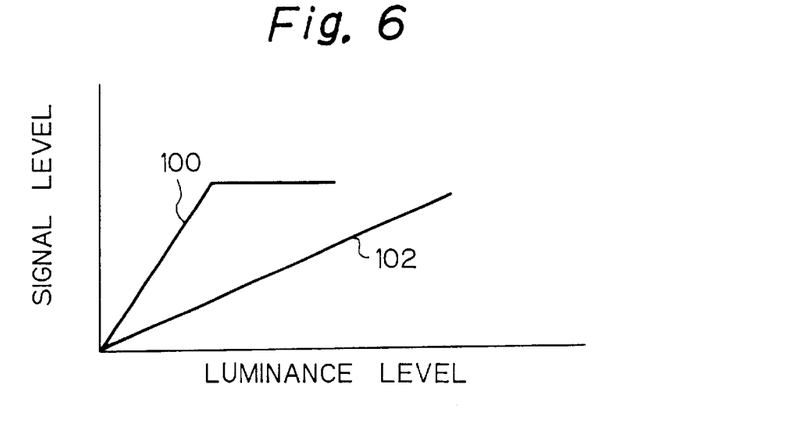
FIGS. 6, 7 and 8 are graphs useful for understanding examples of a wide dynamic range image composition in the embodiment.
Figure 7:
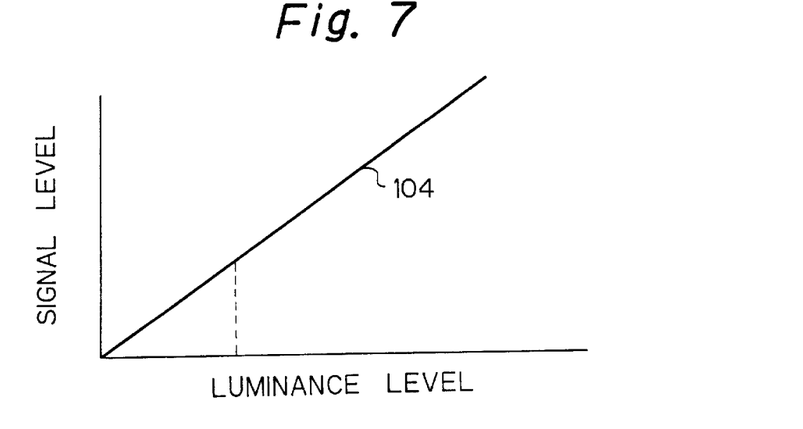
Figure 8:
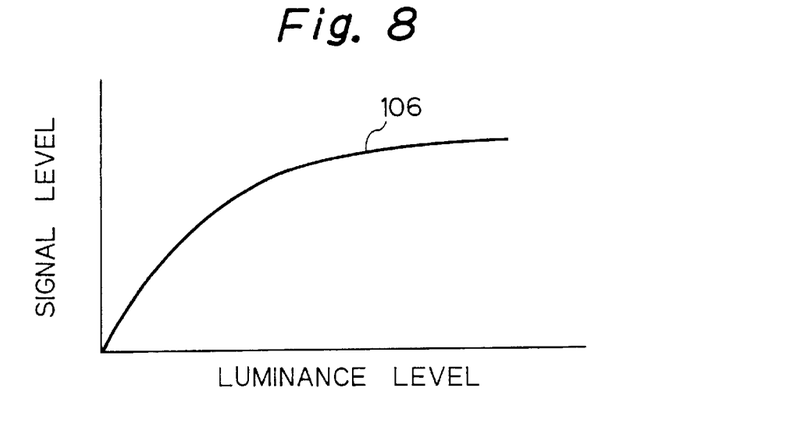

As shown in FIG. 6, when the image pickup device of the DS camera 22 is set at the low sensitivity, its luminance level is plotted as the curve 100, whereas when it is set at the high sensitivity, the luminance level is plotted as the curve 102. Receiving the image data of the frames designated by the additional information 28, the image processor 18 multiplies or compresses the high sensitivity distribution curve 102, and combines it with the low sensitivity distribution curve 100, thereby producing the image with a composite curve 104 as shown in FIG. 7. The image processor 18 compresses the dynamic range of the image to generate the single image 58 with a luminance distribution 106 as shown in FIG. 8. The image 58 is output from the digital photographic printer 20 as the print 14.

The user can have the personal computer system 40 read out the two wide-dynamic range images, and have a display unit, not shown, display them to make a simulation of their composition. In this case, the composite condition of the images, that is, the additional information of the two original images is recorded on the image recording media 12 along with their image data, and is provided to the personal computer system 40. Using the high resolution of the personal computer system 40 makes it possible to provide a high-quality photographic print 14.

With the image reproduction system 10, one can select, by using the additional information 28, any of the plurality of image frames #1-#N, FIG. 5, taken with altering the exposure conditions. For example, a plurality of under-exposure and over-exposure images around a correct exposure are taken by a single shutter release of an electronic still camera, APS camera 34 or photosensitive film camera 36, which has a function of sequential shooting. The exposure of cameras varies owing to the accuracy of their metering systems, to the control accuracy of their shutters and irises, or to forward-light, back-light and high or low contrast scenes. It is possible for an operator to select an optimum frame at the printing, or for a printer with a high accuracy automatic setup function to automatically select the optimum one. Alternatively, the operator selects the optimum frame by checking on the personal computer.

Thus, the additional information indicating that a series of images is taken by altering the exposure in a certain range is acquired, and stored in association with the image data. In the image reproduction system 10, the image processor 18 processes such image data associated with the additional information, and the resultant picture is output from the printer 20.

Figure 9:
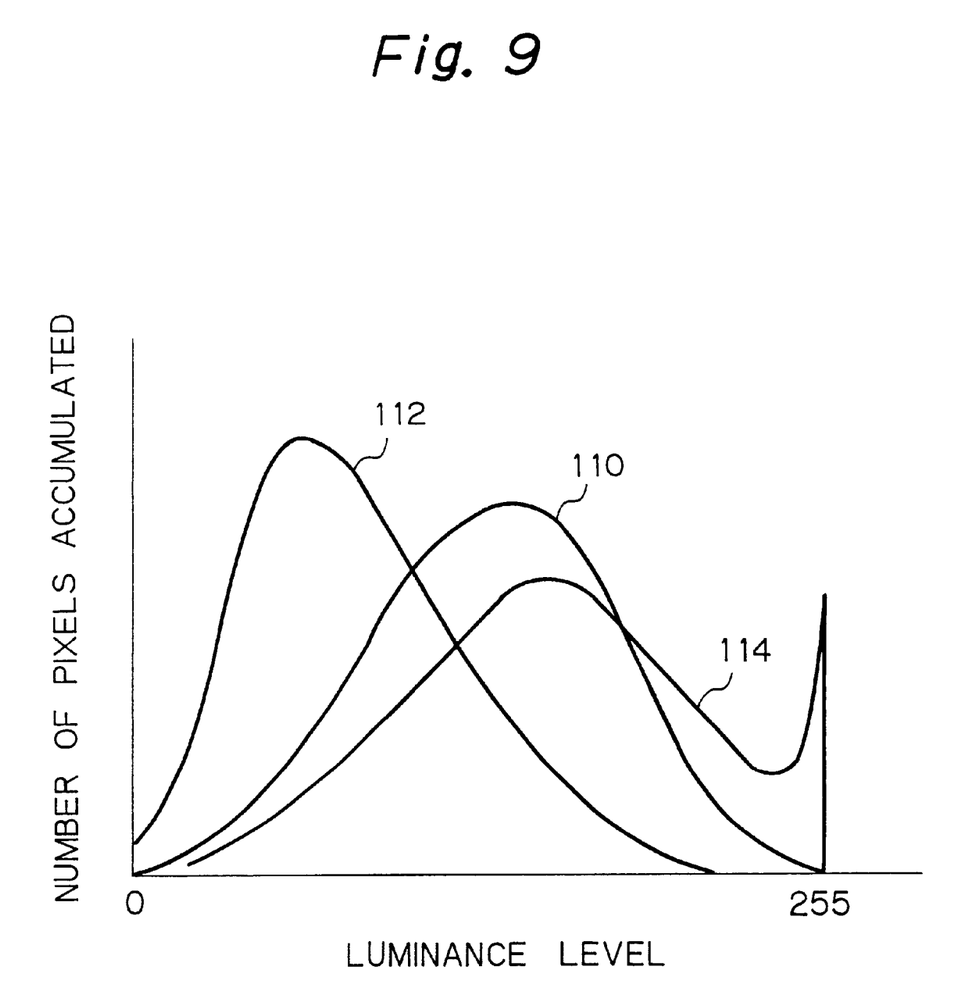
FIG. 9 is a graph useful for understanding a composition of images photographed with altering exposure in the embodiment.

As shown in FIG. 5, for example, one image close to the median is selected from among the series of images #1-#N taken by altering the exposure condition within the certain range. The image processor 18 makes a line graph, or histogram, representing accumulations of the sorted luminance levels appearing on the series of images #1-#N, which is shown in FIG. 9. An image under a correct exposure condition has a curve close to the curve 110. However, the curve 112 is obtained in the under-exposure condition, and the curve 114 is obtained in the over-exposure condition. These image data are passed through the auto-setup function of the image processor 18 so that an appropriate gray level correction value is derived. Under the appropriate exposure, a few levels in the darkest or brightest section are within about 5% of the sum total. The image processor 18 selects on of the series of the images #1-#N, which has a value close to the appropriate gray level correction value, carries out its appropriate correction, and prints it out from the printer 20. Since the DS camera 22 usually has a narrow dynamic range, a high quality photographic print 14 can be obtained by carrying out the foregoing selected or composition of the images not with the DS camera 22 but with the image reproduction system 10 in the laboratory.

Figure 10:
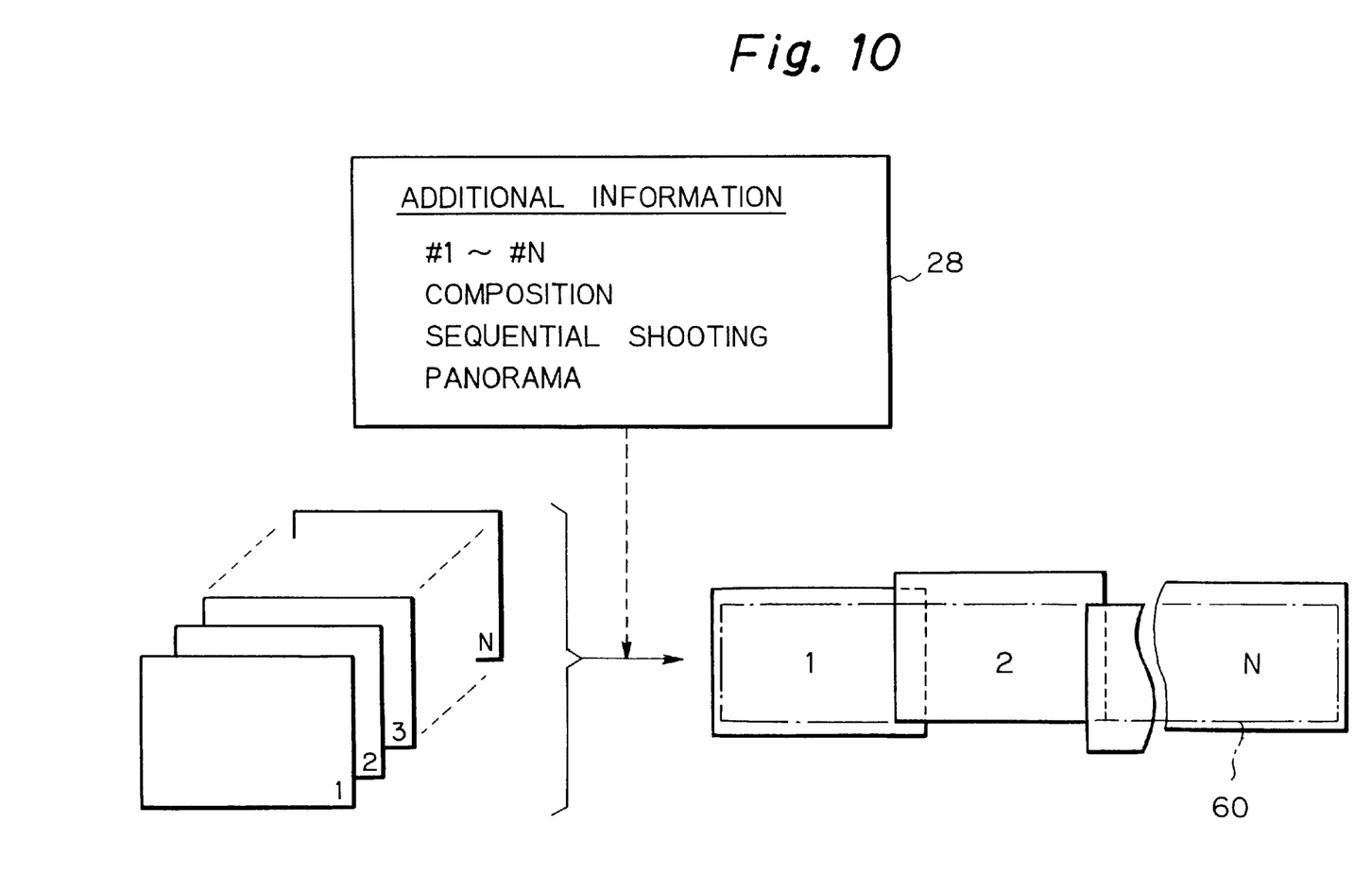
FIG. 10 schematically illustrates a panoramic composition in the embodiment.

A panoramic composite photograph can also be produced by the image reproduction system 10 using the additional information 28. A plurality of photographs #1-#N are taken by the camera 22, for example, with rotating it so that respective frames panoramically overlap a little. The camera 22 records, as the additional information 28, an indication that the photographs are panoramically taken, and the information designating associated frames and their sequence. The image reproduction system 10 arranges the images in the order of shooting in accordance with the additional information 28 as shown in FIG. 10, carries out correlation operation between the overlapped portions, and combines them so that the correlation coefficients become maximum, thereby producing a panoramic photograph 60, in which case, margins of the photograph 60 may be cut out.

The DS camera 22 with a panoramic function can include in its control circuit a panoramic control function that detects an overlapped portion between the objects images of the present and preceding scenes using the image data functioning as a finder in the image pickup device, and releases the shutter of the camera 22 when the ratio of the overlapped portion to the entire area becomes a particular value.

The camera 22 with a sequential shooting function, for example, can also achieve stroboscopic action composition processing. The series of the images #1-#N so far relates to a spatial composition of the images. In contrast with this, the stroboscopic action composition relates to a temporal composition of the images #1-#N.

Figure 11:
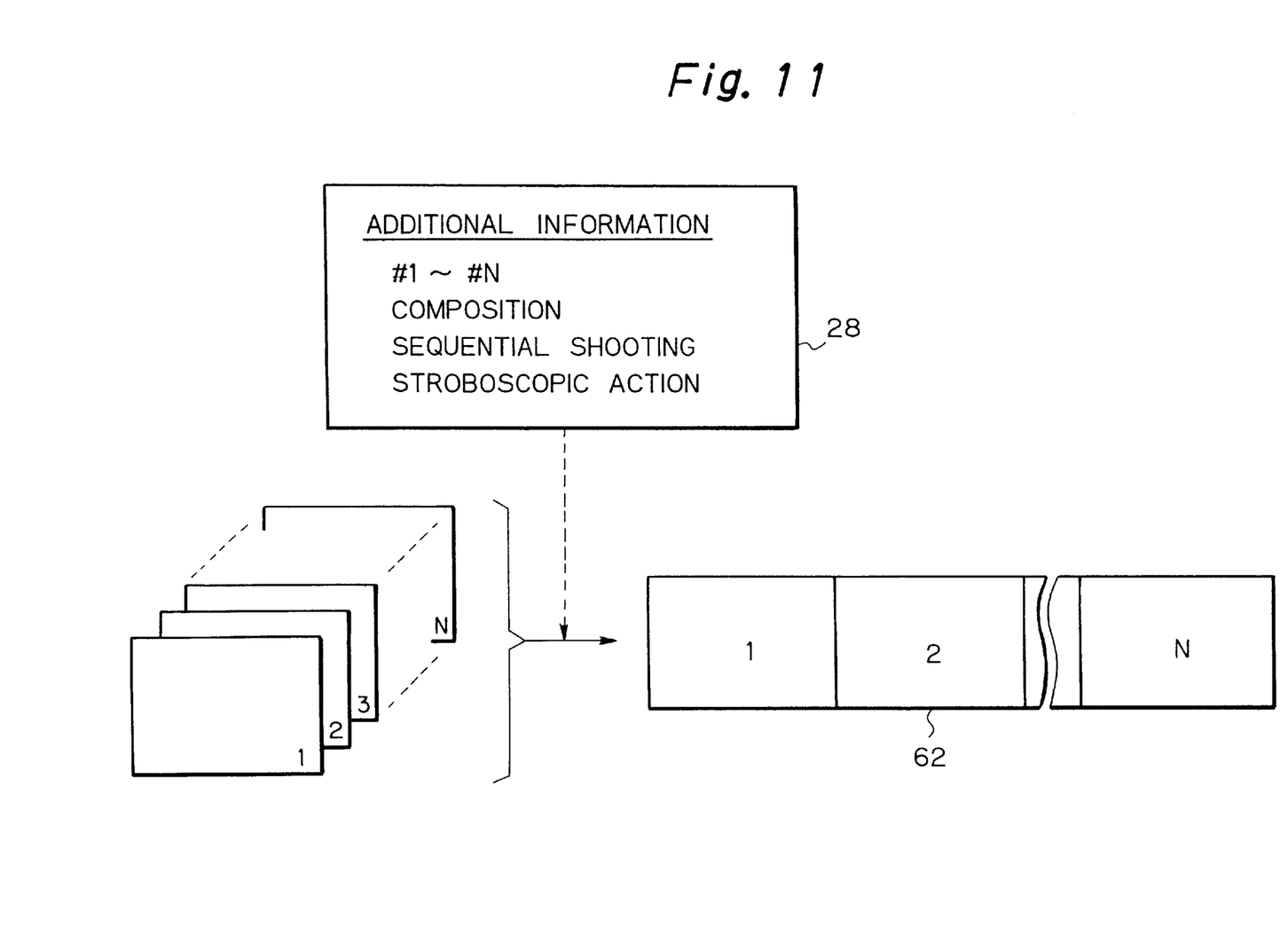
FIG. 11 schematically illustrated a stroboscopic action composition in the embodiment.

For example, the motion of a golf swing or the like is shot sequentially in a single shutter release. In this case, the camera 22 records, as the additional information 28, designation information for identifying each one of a series of the images #1-#N from the beginning to the end of the shooting, and designation information indicative of their sequence and the fact that they are associated with the stroboscopic action composition. The image reproduction system 10 arranges the series of the images #1-#N in the order of shooting in accordance with the additional information 28, and prints them out in the form of a single continuous photograph 62 as shown in FIG. 11. Alternatively, they may undergo multiple print as shown in FIG. 5, that is, printed in the form of the composite photograph 58. In this case, the image processor 18 calculates the differences between the adjacent image data of the series of images #1-#N, and superimposes them into one image by summing up the absolute values of the differences. The superimposed image 58 can include invariant scene like a background by merging a particular image, the image data of the final frame #N, for example, in its entirety.

The output image, such asa image 14, may be directly supplied to the printer 20 as in the present embodiment. In addition, or alternatively to this, an output image can be displayed on the screen of an image monitor like a CRT, not shown, of the image processor 18. Instead of this, before printing in the image reproduction system 10, the user can confirm the composite result on the monitor screen of the personal computer system 40 by generating it through the image processing in the system in accordance with the additional information 28. In this case, it is possible for the additional information 28 to include, if any additional processing is required of the personal computer system 40, data such as conditions for specifying the additional processing.

It is important to note that even in the case where the image data are thus processed by the personal computer system 40, the image data are transferred to the image reproduction system 10 in the form as they are taken by the camera 22 in the present embodiment. The additional information includes various information about processings and image pickup schemes so that the image reproduction system 10 can carry out the image composition. This enables the image reproduction system 10 to produce a high-quality print 14 with maintaining the resolution at the time the images are taken. Although is very difficult for the personal computer system 40 to produce a high-resolution image through composition, the instant embodiment can reproduce the print 14 with a high resolution matching that at the image shooting because the dedicated image reproduction system 10 processes the images on the basis of the additional information. In other words, the image data output from the image pickup device can undergo the image processing by the image reproduction system 10 just as they are output therefrom.

Using the series of the images #1-#N photographed at nearly the same time in connection with their additional information 28 enables the image reproduction system 10 to select a desired image to be printed out. For example, it serves to select a most photogenic portrait without closing eyes or a red eye from among the series of the images #1-#N. In a precious photographic chance which would never come again, several frames are shot with the same subject. Alternatively, in a camera with the function to shoot a plurality of images of the same subject in a single shutter release, the additional information 28 indicating that the image data are associated with the same subject is recorded in connection with the image data. The image reproduction system 10 reproduces the images on the monitor screen so that the optimum image is selected and printed. Instead, while the monitor of the personal computer system 40 reproduces the series of the images #1-#N, the optimum image can be selected and the additional information indicative of that image is recorded. Using its automatic decision function, the image processor 18 can achieve selection of the optimum image by removing such as red eye images or by correcting such portions.

In summary, the DS camera 22 is provided with a mode selection switch, not shown, for selecting one of the processing modes such as wide dynamic range processing, panoramic image composition processing and stroboscopic action processing, which are described above. An operator takes a photograph after selecting a desired processing mode with the switch. Depressing the shutter release button of the camera 22 causes a plurality of images to be sequentially taken in response to the selected mode. At the same time, the selected mode is recorded in the image file 26 as the additional information 28 indicative of the way the images are to be processed or combined.

The image recording media 12 such as the IC memory 24 like a PC card, on which the image file 26 are thus recorded, are accepted at a specialty store and is sent to a laboratory so that the image reproduction system 10 therein makes a decision of the images associated with each other in accordance with the instruction of the additional information 28, and processes and combines them. After combining them into a single image, the digital photographic printer 20 prints it. The print 14 is handed to the customer at the store.

Although the print 14 is produced directly from the image recording media 12 in the foregoing example, the system may be adapted to allow the personal computer system 40 to read out the image data 30 and additional information 28, to process and compose them in accordance with the instructions of the additional information 28, and to have the composite result displayed on the image monitor confirmed as to whether it satisfies desired conditions. In addition, the system may also be adapted to correct the additional information 28 or to attach new additional information, such as instructions about a new processing or designation of a new printing condition. In any case, it is only the additional information 28 that is subjected to the correction or addition before being sent to the image reproduction system 10. Even if the image data are processed by the personal computer system 40 for the purpose of confirmation, the original image data 30 as they are photographed by the camera 22 are sent to the image reproduction system 10.

That is the case with the APS camera 34. More specifically, the APS camera 34 is also provided with a mode selection switch, not shown, for selecting one of the processing modes such as the wide dynamic range processing, panoramic image composition processing and stroboscopic action processing, which are described above. An operator manipulates the mode selector switch to select a desired processing mode, and then takes a subject. Depressing the shutter release button of the camera 34 causes a plurality of frames of image to be sequentially taken in the selected mode. At the same time, data representing the selected mode is magnetically recorded on the magnetic recording stripes, specifically, on the index (IX) information recording area, not shown, of the APS film 32 as the additional information 28 that indicates the way the images are to be processed or combined. The additional information 28 together with the image on the APS film 32 constitutes the image file 26. In an application of the APS camera 34 which uses a film cartridge with the IC memory, i.e. the enhanced APS camera, the additional information 28 is stored in the IC memory. The processing following this may be the same as in the case of the DS camera 22.

The visible image recorded on the APS film 32 can be read into the personal computer system 40 with the recording medium reader/writer 46 such as an APS film scanner, and be handled as digital data. The processing following this may be the same as in the case of the DS camera 22. To the image reproduction system 10, transferred is not the digital image data thus processed by the personal computer, but the APS film 32.

The visible image 38 already produced in the form of a negative film or a print can be read into the personal computer system 40 using the film scanner 44, and be handled as digital data. More specifically, the personal computer system 40 processes and combines them, and after the operator confirms them on the monitor screen, the additional information 28 is generated. The additional information 28 is recorded in the large capacity recording medium 42 like a floppy disk, and is sent to the image reproduction system 10 together with the film 38. The processing following this may be the same as in the case of the DS camera 22.

According to the present invention, the image data output from the image pickup device can be provided to the image reproduction system as they are taken, and undergo the image processing in accordance with the additional information. The present invention therefore provides an image print system which can produce a high-quality photograph print from an image file having additional information, using various types of the image data and the additional information associated therewith.

The entire disclosures of Japanese patent applications Nos. 98392/1997 and 83792/1997 filed on Apr. 1 and 2, 1997, respectively, including the specifications, claims, accompanying drawings and abstracts of the disclosure are incorporated herein by reference in their entirety.

While the present invention has been described with reference to the particular illustrative embodiments, it is not to be restricted by those embodiments. It is to be appreciated that those skilled in the art can change or modify the embodiments without departing from the scope and spirit of the present invention.

What is claimed is:

1. A method of printing a picture from a digital image file having additional information, said method comprising the steps of:

capturing, with a digital still camera, an image of a subject and generating digital image data representing the image of the subject;

generating a digital form of additional information on at least one selected from a group consisting of a photographing method, a photographing parameter, a signal processing method, a shading value and a correcting value of photosensitive cell defects of an image sensor of the camera, a dynamic range processing, a form of the image data, and a set value set in the camera in said step of capturing the image, said additional information being generated in the camera;

forming an electronic digital data file including the image data and the additional information in the camera;

preparing an image reproduction system separate from the camera;

transferring the data file to the image reproduction system;

processing the image data with the reproduction system, said processing based on the transferred additional information; and producing a visible image from the processed image data in a form of a printed picture.

2. A method in accordance with claim 1, wherein, in said step of transferring, the data file is transferred via an integrated circuit memory card to the image reproduction system.

3. A method of printing an image comprising the steps of:

preparing an electric digital data file including digital image data representative of an image obtained by taking a subject with a digital still camera and a digital form of additional information on at least one selected from a group consisting of a photographing method, a photographing parameter, a signal processing method, a shading value and a correcting value of a photosensitive cell defects of an image sensor of the camera, a dynamic range processing, a form of the image data, and a set value set in the camera in said step of capturing the image, said additional information being generated and said data file being formed in the camera;

recording the data file on an electronic recording medium;

preparing an image reproduction system separate from the camera;

transferring the data file from the recording medium to the image reproduction system;

processing the image data with the reproduction system, said processing based on the transferred additional information; and producing a visible image from said processed image data in a form of a printed picture.

4. The method in accordance with claim 3, wherein the additional information includes information on a picture quality of the image data.

5. The method in accordance with claim 4, said additional information including information effective in improving picture quality of said image data.

6. The method in accordance with claim 4, said additional information including information effective in correcting picture quality of said image data.

7. The method in accordance with claim 4, said additional information including information for improving picture quality of said image data in post-processing of said image data.

8. The method in accordance with claim 4, said additional information including information for setting up a printer to print said image represented by image data.

9. The method in accordance with claim 3, said step of transferring the image file further includes transferring the data file over a telecommunications channel.

10. A method in accordance with claim 3, wherein the recording medium is an integrated circuit memory card.

11. An image print system for printing a picture, comprising:

an input device for receiving digital image data and a digital form of additional information from an electronic digital data file that is generated in a digital still camera and recorded on an electronic recording medium, said image data being formed by taking an image of a subject and representative of the image of the subject, said additional information that is generated in the camera being at least one selected from a group consisting of a photographing method, a photographing parameter, a signal processing method, a shading value and a correcting value of photosensitive cell defects of an image sensor of the camera, a dynamic range processing, a form of the image data, and a set value set in the camera for capturing the image;

an image processor connected to said input device for processing said image data in accordance with said additional information; and an output device for producing a visible image from said processed image data in the form of a printed picture.

12. The system in accordance with claim 11, wherein the additional information includes information on a picture quality of the image data.

13. The system in accordance with claim 12, said additional information including information effective in improving said picture quality of said image data.

14. The system in accordance with claim 12, said additional information including information effective in correcting said picture quality of said image data.

15. The method in accordance with claim 12, said additional information including information for improving said picture quality of said image data in post-processing of said image data.

16. The method in accordance with claim 12, said output device including a printer for printing said image represented by said image data, said additional information including information effective in setting up said printer.

17. A method in accordance with claim 11, wherein the recording medium is an integrated circuit memory card.

18. A method of printing a picture, captured in a digital still camera, from a digital image file having addition information, comprising the steps of:

capturing an image and generating digital image data representing the image with an image reader;

generating a digital form of addition information in a way to handle the image data, which is required when the image is reproduced in a form of a visible image, on at least one of a photographing method, a photographing parameter, a signal processing method, a shading value and a correcting value of photosensitive cell defects of the image sensor, a dynamic range processing, a form of the image data, and a set value set in said camera;

forming an electronic digital data file including the image data and the additional information;

recording the data file on an electronic recording medium;

transferring the data file including the image data and additional information from the recording medium to an image reproduction system;

processing the image data based on the additional information transferred by the reproduction system; and producing a visible image from the processed image data in a form of a printed picture.

19. A method in accordance with claim 18, wherein the recording medium is an integrated circuit memory card.

20. A method of printing a picture from a digital image file having additional information, comprising the steps of:

preparing a digital still camera;

capturing an image of a subject and generating digital image data representing the subject with the camera;

generating, with the camera, a digital form of additional information on at least one selected from a group consisting of a photographing method, a photographing parameter, a signal processing method, a shading value and a correcting value of photosensitive cell defects of an image sensor of the camera, a dynamic range processing, a form of the image data, and a set value set in the camera in said step of capturing the image;

forming an electronic digital data file, including the image data and the additional information, with the camera;

recording the data file with the camera on an electronic recording medium thereof;

preparing an image print system separate from the camera;

processing, by the image print system, the image data based on the additional information recorded in the recording medium; and producing a visible image from the processed image data in a form of a printed picture.

21. The method in accordance with claim 20, wherein the recording medium is an integrated circuit memory card.

22. An image print system for printing an image, comprising:

a digital still camera for capturing an image of a subject and generating digital image data representing the image of the subject, for generating a digital form of additional information on at least one selected from a group consisting of a photographing method, a photographing parameter, a signal processing method, a shading value and a correcting value of photosensitive cell defects of an image sensor of the camera, a dynamic range processing, a form of the image data, and a set value set in the camera for capturing the image, and for recording the image data and the additional information as an electronic digital data file in an electronic medium; and an image print system separate from said camera for processing the image data on the basis of the additional information recorded in the recording medium, and for producing a visible image from the processed image data in a form of a printed picture.

23. The system in accordance with claim 22, wherein the recording medium is an integrated circuit memory card.

24. An image print system for printing an image, comprising:

a digital still camera for capturing an image of a subject and generating digital image data representing the image of the subject, a processor for selecting a digital form of additional information that is generated by the camera on at least one selected from a group consisting of a photographing method, a photographing parameter, a signal processing method, a shading value and a correcting value of photosensitive cell defects of an image sensor of the camera, a dynamic range processing, a form of the image data, and a set value set in the camera for capturing the image, for forming an electronic digital data file including the image data and the additional information, and for recording the image file in an electronic recording medium; and an image print system separate from said camera for processing the image data on the basis of the additional information recorded in the recording medium, and for producing a visible image from the processed image data in a form of a printed picture.

25. The system in accordance with claim 24, wherein the recording medium is an integrated circuit memory card.

26. A digital still camera for capturing an image of a subject with an image sensor and generating digital image data representing the image of the subject the camera comprising:

a digital recorder for generating a digital form of additional information being at least one selected from a group consisting of a photographing method, a photographing parameter, a signal processing method, a shading value and a correcting value of photosensitive cell defects of the image sensor, a dynamic range processing, a form of the image data, and set value set in said camera; and an electronic recording medium for recording the image data and the additional information in a form of an electronic digital data file, whereby an image print system separate from said camera processes the image data on the basis of the additional information recorded in the recording medium and produces a visible image from the processed image data in a form of a printed picture.

27. The camera in accordance with claim 26, wherein the recording medium is an integrated circuit memory card.

28. An image printing apparatus, comprising:

an input device for receiving digital image data including a digital form of additional information recorded in an electronic data file together with image data recorded in an electronic recording medium;

a processor for processing digital image data on a basis of a digital form of additional information recorded in an electronic digital data file together with image data on an electronic recording medium, and an output device for producing a visible image from the processed image data in a form of a printed picture, wherein the image data is generated by capturing an image of a subject with a digital still camera separate from the printing apparatus and representing the image of the subject, and the additional information is generated by the camera and being at least one selected from a group consisting of a photographing method, a photographing parameter, a signal processing method, a shading value and a correcting value of photosensitive cell defects of an image sensor, a dynamic range processing, a form of the image data, and set value set in the camera.

29. The apparatus in accordance with claim 28, wherein the recording medium is an integrated circuit memory card.

* * * * *